D. L. LINDQUIST & D. C. LARSON.
BRAKE APPARATUS.
APPLICATION FILED JULY 7, 1914.
1,248,512.
Patented Dec. 4, 1917.
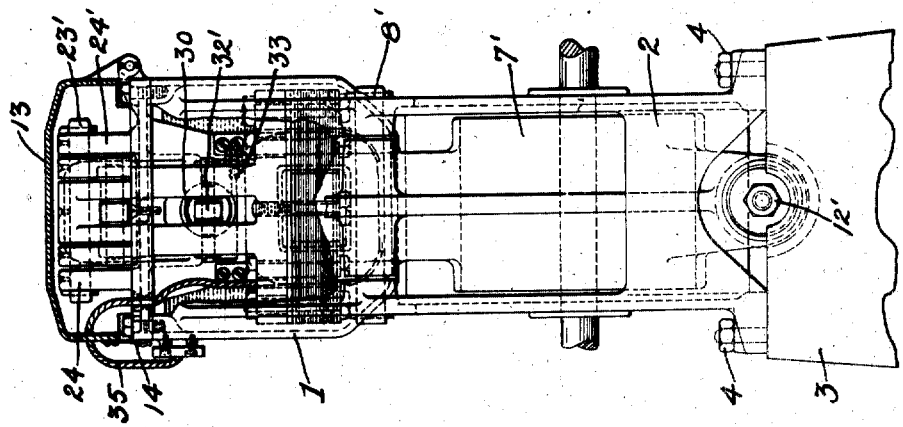
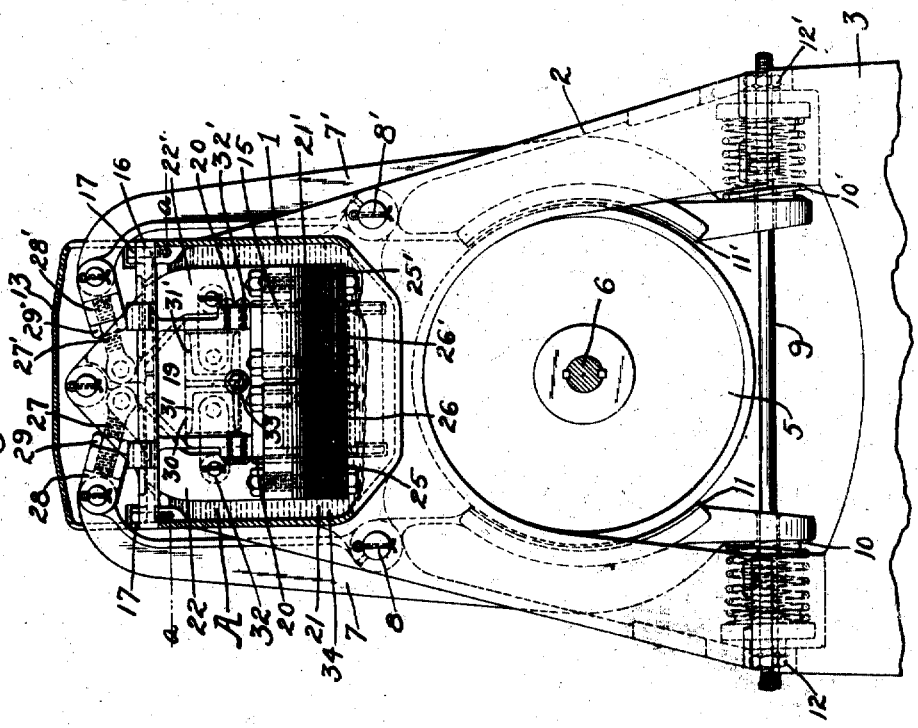
WITNESSES:
Ernest L. Gale Jr.
Arthur Truzise Jr.
INVENTORS
David L. Lindquist
David C. Larson
BY
L. H. Campbell
ATTORNEY

UNITED STATES PATENT OFFICE.

DAVID L. LINDQUIST AND DAVID C. LARSON, OF YONKERS, NEW YORK, ASSIGNORS TO OTIS ELEVATOR COMPANY, OF JERSEY CITY, NEW JERSEY, A CORPORATION OF NEW JERSEY.

BRAKE APPARATUS.

1,248,512.  Specification of Letters Patent.  Patented Dec. 4, 1917.

Application filed July 7, 1914. Serial No. 849,446.

*To all whom it may concern:*

Be it known that we, DAVID L. LINDQUIST, a subject of the King of Sweden, and DAVID C. LARSON, a citizen of the United States, residing in Yonkers, in the county of Westchester and State of New York, have invented a new and useful Improvement in Brake Apparatus, of which the following is a specification.

Our invention relates to brake apparatus, and more particularly to alternating current electric brakes such as are used with electric elevators.

One of the objects of the invention is the provision of an alternating current brake apparatus embodying improved details of construction and arrangement of parts in general, and wherein sliding friction surfaces are eliminated from the movable parts of the electromagnet.

Another object of the invention is the provision of improved fluid retarding means for the magnet armatures, the same being arranged and constructed in such a manner as to eliminate the use of stuffing boxes, packed joints, etc., such as are now commonly used, but which practice forms a source of trouble on account of objectionable leakage.

Other objects of the invention will appear more fully hereinafter, the novel combination of elements and arrangements of parts being pointed out in the appended claims.

Referring to the drawings, Figure 1 represents in elevation, an electromagnetic brake constructed in accordance with our invention, and with certain parts shown in section; Fig. 2 shows an end view of Fig. 1, with certain parts shown in section.

Like characters of reference represent corresponding parts in both figures.

In detail the mechanism shown in Figs. 1 and 2 comprises a casing or pot 1, which is formed integrally with the standard 2. The standard is secured to a suitable base or bed plate 3 by means of bolts 4.

A brake pulley 5 is rigidly mounted upon a shaft 6. Brake shoe levers 7, 7' are pivotally mounted at 8, 8', respectively on the standard 2. The lower ends of these brake-shoe levers are connected together by a rod 9. Springs 10, 10', are used in conjunction with this rod to apply the brake shoes 11, 11' to the brake pulley 5, the pressure of the springs being regulated by means of adjusting nuts 12, 12'.

The parts thus far described are of a well-known type and have been described only briefly. Coming now to the particular improvements which form the subject-matter of the present invention, the same will be described more in detail. One of the improvements has to do with the electro-magnet A, and more particularly the movable parts thereof which are constructed and arranged in such a manner as to eliminate sliding friction, etc., which feature thereof greatly increases the efficiency of the magnet and reduces wear, as compared with the alternating current brake magnets now in common use wherein the armatures or cores are of the reciprocating or plunger type. In the present instance the electro-magnet A is contained within the casing 1, which is provided with a hinged cover 13, and a suitable fastener therefor such as 14. The electro-magnet in detail comprises a spool 15 which is adapted to receive the winding. The spool is suspended by suitable brackets 20, which are fixed to the depending member 19 formed integrally with a plate 16. The plate fits the top of the casing 1 and is secured thereto by means of bolts 17, which engage lugs 18 on the inside of the casing. The electro-magnet further comprises two armatures 21, 21', which are pivotally supported by a pin 23' carried by lugs 24, 24', which form an integral part of the plate 16. Bolted to the lateral projections of the arms 22, 22' are a series of laminated plates 25, 25', respectively. These plates are constructed substantially in the form of the letter E, with the three projecting portions forming magnetic poles. The middle projection of the two plates extend into the magnet spool at opposite ends thereof. At a point near the fulcrum point of the arms 22, 22' are pivoted eyebolts 27, 27', which through associated links 28, 28' form an operative connection between the brake levers 7, 7' and the armatures 21, 21', respectively. Proper adjustment between the brake levers and the armatures may be made by means of the adjusting nuts 29, 29'.

It is desirable in connection with alternating current electromagnets to provide means for retarding the movements of the movable parts actuated by the magnet. This is for the reason that an alternating current magnet tends to operate the movable parts with a too sudden movement, which may injure the same. Now up to the present time various forms of fluid retarders are used for the purpose of overcoming this objectionable feature, but they are found unsatisfactory on account of leaky stuffing boxes, joints, etc., which allow the escape of the fluid to the outside of the casing. In the present invention it is the aim to overcome these objectionable features by an improved construction and arrangement of the fluid retarding mechanism, which will now be described. The depending member 19 is provided with a bore 30 adapted to receive pistons 31, 31' which have a longitudinal movement therein. These pistons 31, 31' are connected respectively with the magnet armatures 22, 22', through a usual connection such as 32, 32'. At a suitable point in the depending member 19 is a fluid passage 33, which communicates fluid from the casing into the bore 30, or vice versa, dependent of course on the direction of movement of the pistons in the bore. This fluid passage is regulated by means of an adjusting member 34, so as to restrict the flow of fluid therethrough. Thus it will be seen that the pistons in their movement toward each other are assisted by the insulating liquid 34', which is confined within the casing 1 and immerses the entire electromagnet and armatures. The terminals of the magnet winding are led through a conduit designated 35, and are connected to a suitable terminal block designated 36.

The operation of the brake apparatus herein illustrated will now be described. Upon sending current into the winding of the electromagnet, the same becomes energized and attracts the armatures which will now rock on their pivots toward each other and assume a position as illustrated in Fig. 1. The tendency of the armatures to move quickly or suddenly is resisted by the fluid between the pistons, which latter will now act to force the fluid through the restricted passage. This movement of the armatures to their attracted position effects the actuation of the brake levers against the action of the springs, thus releasing the brake shoes from the brake pulley and allowing free rotation of the latter.

Now upon the deënergization of the magnet winding, the springs 10, 10', will urge the brake shoes against the pulley 5, and due to the particular arrangement of retarding mechanism, a quick initial, but light application of the brake shoes to the pulley 5 is effected, with the full braking power retarded. The above result is very evident, since it will readily be seen, that the power required initially to move the piston outwardly is of a negligible amount, and thus the pistons offer practically no resistance to the action of the springs, which will therefore apply the brake shoes quickly but lightly to the brake pulley. Now after such initial movement of the pistons outwardly or away from each other, a vacuum is created therebetween which is gradually displaced by fluid which is sucked through the restricted passage, and the action of the pistons now in being moved out of the vacuum results in a retarded full braking power, and a gradual application of the brake shoes to the brake pulley. Another feature of the invention which has not as yet been touched upon, lies in the provision of the lock nuts 36', 36', on the rod 9. These lock nuts are so adjusted on the rod 9 as to permit proper movement of the brake levers, and are provided so that in case one of the springs 10, 10' should break, the other or good spring will be effective in bringing both of the brake shoes into engagement with the brake pulley.

While we have shown a brake apparatus particularly adapted to the use of single phase alternating currents, the same may be used to equal advantage with polyphase or other currents of any nature, and the brake apparatus as a whole, while particularly adapted to electric elevators, may be used to advantage whenever it is desired to employ an electrically operated brake.

Without limiting ourselves to the precise construction and arrangements of parts herein described and illustrated, what we claim as new and desire to secure by Letters Patent of the United States is:—

1. In alternating current brake apparatus, the combination with a brake pulley, means for applying friction to the pulley, and an electromagnet having coacting depending pivoted armatures rotatable about a common pivot for releasing the friction applying means.

2. In alternating current brake apparatus, the combination with a brake pulley, means for applying friction to the brake pulley, means comprising an electromagnet having coacting armatures arranged on a common pivot, for effecting the release of the friction applying means, and fluid actuating mechanism operatively associated with the said armature to govern the friction applying means.

3. In alternating current brake apparatus, the combination with a brake pulley, means for applying friction to the said pulley, an electromagnet having co-acting independent armatures mounted on a common pivot for effecting the release of the friction applying means, and fluid actuating mechanism operatively associated with the armatures and arranged to force liquid through a restricted passage, to govern the friction applying means.

4. In alternating current brake apparatus, the combination with a brake pulley, means for applying friction to the brake pulley, means comprising an electromagnet having co-acting laminated armatures which are fulcrumed on a common pivot, for effecting the release of the friction applying means, and fluid actuating mechanism operatively associated with the armatures and arranged to force fluid through a restricted passage, to govern the friction applying means.

5. In alternating current brake apparatus, the combination with a brake pulley, means for applying friction to the brake pulley, means comprising an electromagnet having co-acting armatures which are fulcrumed on a common pivot for effecting the release of the friction applying means, and a piston operatively connected to each armature, said pistons being arranged to force fluid through a restricted passage common to both of the said armatures, to govern the friction applying means.

6. In alternating current brake apparatus, the combination with a brake pulley, means for applying friction to the brake pulley, electromagnetic means for effecting the release of said friction applying means, said means comprising an electromagnet having co-acting dependent armatures, a piston operatively connected to each one of the said armatures, a receptacle for the pistons, and means for supplying fluid between the said pistons.

7. In alternating current brake apparatus, the combination with a brake pulley, means for applying friction to the brake pulley, means for effecting the release of said friction applying means, the latter comprising an electromagnet and armature therefor arranged on a common pivot, and fluid actuating retarding means for the armatures, said means comprising a piston operatively connected to each one of the said armatures, a receptacle for the pistons, and a restricted fluid passage in said receptacle.

8. In alternating current brake apparatus, the combination with a brake pulley, a pair of brake levers, a spring adapted normally to hold the levers in frictional engagement with the brake pulley, an electromagnet, armatures therefor pivoted together directly on a common pivot, and a connection between the said armatures and the brake levers.

9. In alternating current brake apparatus, the combination with a brake pulley, a pair of brake levers pivoted at an intermediate point and adapted to engage said pulley, springs connected to said levers at one end thereof, and an alternating current electromagnet having laminated armatures pivoted together, directly on a common pivot to withdraw the brake levers from in frictional engagement with the brake pulley and operatively connected to the other ends of said brake levers.

10. In alternating current brake apparatus, the combination with a brake pulley, a pair of pivoted brake levers having independent pivots, a spring adapted normally to hold the levers in frictional engagement with the brake pulley, an electromagnet, armatures therefor mounted directly on a common pivot, and a connection between the said armatures and the brake levers.

11. In alternating current brake apparatus, the combination with a brake pulley, a pair of pivoted brake levers having independent pivots, and adapted to engage said pulley, springs connected to said levers at one end thereof, and an alternating current electromagnet having laminated armatures mounted directly on a common pivot and operatively connected to the other ends of said brake levers to withdraw the brake levers from in frictional engagement with said pulley.

12. In alternating current brake apparatus, the combination with a brake pulley, a pair of pivoted brake levers adapted to engage said pulley, springs arranged normally to hold the levers in frictional engagement with the brake pulley, and means for effecting the release of the said levers, said means comprising an alternating current electromagnet, coacting armatures therefor arranged on a common pivot, and an adjustable connection between the said armatures and the said brake levers.

13. In an electric brake, the combination with a brake pulley, a pair of pivoted brake levers, a spring arranged at one end thereof for normally holding the levers in frictional engagement with the brake pulley, and an electro-magnet having co-acting armatures arranged on a common pivot, said armatures being operatively connected through an adjustable connection to the other ends of the said brake levers.

14. In an electric brake, the combination with a brake pulley, a pair of pivoted brake levers, springs connected to one end of said levers to apply brake-levers to the brake pulley, an alternating current magnet having coacting laminated armatures arranged on a common pivot and adjustably connected to the other ends of the said brake levers to withdraw the brake levers from in engagement with the brake pulley, and a piston operatively connected with each armature, said pistons being adapted to force fluid through a restricted passage common to both of the said pistons when attracted by the said magnet, to govern the brake applying means.

15. In an electro-responsive brake apparatus, the combination of a brake pulley, a brake standard having a casing containing fluid forming an integral part thereof, a pair of brake levers pivotally connected to the said standard, a pair of springs connected to one end of said levers, an electromagnet contained in the casing and having coacting laminated armatures arranged on a common pivot, and operatively connected to the other end of the said brake levers, and fluid actuating means for retarding the movement of the core.

16. In an electro-responsive device, the combination with an electro-magnet, co-acting armatures therefor arranged on a common pivot, a casing containing fluid surrounding the said armature, and means for retarding the movement of the said armatures, said means comprising pistons arranged to force fluid through a restricted passage when the said armatures are attracted by the magnet.

17. In an electro-responsive device, the combination with an electromagnet, a laminated movable armature therefor, a casing containing fluid surrounding the said magnet and armature, and means associated with the fluid for retarding the movement of the said armature, said means comprising a piston operatively connected to the core and adapted to force fluid through a restricted passage when the said armature is attracted.

18. In an electro-responsive device, the combination with an electromagnet, co-acting dependent armatures therefor arranged on a common pivot, a casing containing fluid surrounding the said magnet and armatures, and fluid actuating means for retarding the movement of the armatures, said means comprising a piston operatively connected to each one of the said armatures and adapted to force fluid through a restricted passage common to both of the said pistons.

In testimony whereof, we have signed our names to this specification in the presence of two subscribing witnesses.

DAVID L. LINDQUIST.
DAVID C. LARSON.

Witnesses:
WALTER C. STRANG,
ARTHUR TREZISE, Jr.